(12) United States Patent
Chan et al.

(10) Patent No.: US 9,557,983 B1
(45) Date of Patent: Jan. 31, 2017

(54) FLEXIBLE STORAGE APPLICATION DEPLOYMENT MECHANISM

(75) Inventors: Hwai-Yeng Chan, Cary, NC (US); Sateesh Pallapothu, Cary, NC (US)

(73) Assignee: EMC Corporation, Hopkinton, MA (US)

( * ) Notice: Subject to any disclaimer, the term of this patent is extended or adjusted under 35 U.S.C. 154(b) by 289 days.

(21) Appl. No.: 12/980,958

(22) Filed: Dec. 29, 2010

(51) Int. Cl.
G06F 9/44 (2006.01)
G06F 9/445 (2006.01)

(52) U.S. Cl.
CPC . G06F 8/65 (2013.01); G06F 8/61 (2013.01); G06F 8/68 (2013.01)

(58) Field of Classification Search
CPC ............... G06F 8/60; G06F 8/61; G06F 8/63; G06F 8/65; G06F 8/68; G06F 8/70; G06F 8/71; G06F 8/76; G06F 8/66; G06F 8/665; G06F 8/67
USPC ..................................... 717/168–178; 714/15
See application file for complete search history.

(56) References Cited

U.S. PATENT DOCUMENTS

| | | | | |
|---|---|---|---|---|
| 5,758,149 | A * | 5/1998 | Bierma | G06F 17/30348 |
| 5,809,287 | A * | 9/1998 | Stupek, Jr. | G06F 8/68 703/22 |
| 5,828,876 | A * | 10/1998 | Fish | G06F 17/30224 |
| 5,987,621 | A * | 11/1999 | Duso | G06F 11/2023 348/E5.008 |
| 6,189,147 | B1 * | 2/2001 | Davis | 717/175 |
| 6,643,722 | B1 * | 11/2003 | Scraringella | G06F 13/387 710/107 |
| 6,745,286 | B2 * | 6/2004 | Staub | G06F 9/5083 710/305 |
| 6,836,657 | B2 * | 12/2004 | Ji | G06F 8/68 455/418 |
| 7,051,050 | B2 * | 5/2006 | Chen | G06F 17/30067 707/679 |
| 7,185,332 | B1 * | 2/2007 | Waldin et al. | 717/170 |

(Continued)

OTHER PUBLICATIONS

WhatIs.com, Definition: State Machine, Sep. 2005, last retrieved from http://whatis.techtarget.com/definition/state-machine on Dec. 12, 2014.*

(Continued)

*Primary Examiner* — Wei Zhen
*Assistant Examiner* — Andrew M Lyons
(74) *Attorney, Agent, or Firm* — Schmeiser, Olsen & Watts LLP

(57) ABSTRACT

Programming methods and products are described for developing and producing installation and/or upgrade software for systems where multiple versions of software are available. Information is stored representing the version of software that is being installed, the version of software being installed having an updated feature. Groups of commands enable the transition from a present version of the software to another version of software having another version of the feature. An example of such a feature is deployment of logical volume partitions. A state machine is executed that consults the stored information to access one or more of the groups of commands. The one or more groups of commands is executed to transition from the present version of the software to the version of software that is being installed having the updated feature. If an error occurs during the execution of a group of commands, then recovery information including remediation commands is executed.

16 Claims, 14 Drawing Sheets

(56) References Cited

U.S. PATENT DOCUMENTS

| | | | | |
|---|---|---|---|---|
| 7,219,260 | B1* | 5/2007 | de Forest | G06F 11/1474 714/15 |
| 7,350,205 | B2* | 3/2008 | Ji | 717/172 |
| 7,373,364 | B1* | 5/2008 | Chapman | G06F 11/1451 |
| 7,441,152 | B2* | 10/2008 | Kato | 714/26 |
| 7,555,569 | B1* | 6/2009 | O'Hare | G06F 3/0611 707/999.2 |
| 7,555,749 | B2* | 6/2009 | Wickham et al. | 717/168 |
| 7,609,651 | B1* | 10/2009 | McBride | G06F 3/0605 370/252 |
| 7,620,392 | B1* | 11/2009 | Maurya | G06F 8/65 455/418 |
| 7,971,091 | B1* | 6/2011 | Bingham | G06F 11/1446 714/6.12 |
| 7,984,131 | B1* | 7/2011 | Gandhi | H04L 41/0856 707/609 |
| 8,095,764 | B1* | 1/2012 | Bauer | G06F 3/0605 711/162 |
| 8,453,141 | B1* | 5/2013 | Poole | G06F 8/68 717/169 |
| 2002/0002661 | A1* | 1/2002 | Blumenau | G06F 3/061 711/165 |
| 2005/0278701 | A1* | 12/2005 | Buskens | G06F 11/1438 717/120 |
| 2006/0212671 | A1* | 9/2006 | Todd | G06F 3/061 711/165 |
| 2006/0229772 | A1* | 10/2006 | McClary | G06F 8/65 701/3 |
| 2006/0282834 | A1* | 12/2006 | Cheng | G06F 8/62 717/174 |
| 2007/0220032 | A1* | 9/2007 | Kapoor | G06F 8/61 |
| 2007/0243900 | A1* | 10/2007 | Edwards | G06F 8/65 455/554.1 |
| 2007/0261017 | A1* | 11/2007 | Sanghvi | G06Q 10/06 717/100 |
| 2008/0127170 | A1* | 5/2008 | Goldman et al. | 717/174 |
| 2008/0244682 | A1* | 10/2008 | Sparrell | H04N 7/17318 725/134 |
| 2009/0094596 | A1* | 4/2009 | Kuiper et al. | 717/174 |
| 2009/0282399 | A1* | 11/2009 | Kamrowski | G06F 8/68 717/174 |
| 2010/0281239 | A1* | 11/2010 | Sudhakar | G06F 9/3824 712/222 |
| 2011/0113419 | A1* | 5/2011 | Ewington | G06F 8/68 717/171 |
| 2011/0289499 | A1* | 11/2011 | Haubold | G06F 8/65 717/173 |

OTHER PUBLICATIONS

Haas, Brian, "Pros and Cons of File Patching, Update Chaining, vs. Broader Multi-Version Application Updates," The AppLife Update Blog, Mar. 16, 2010, last retrieved from http://blog.kineticjump.com/2010/03/16/ProsAndConsOf-FilePatchingUpdateChainingVsBroaderMulti VersionApplicationUpdates.aspx on Oct. 17, 2016.*

Shastry, Mallikarjuna and Venkatesh, K., "Selection of a Checkpoint Interval in Coordinated Checkpointing Protocol for Fault Tolerant Open MPI," International Journal on Computer Science and Engineering, vol. 02, No. 06, 2010, pp. 2064-2070.*

Soundarrajan, Saravanakumar and Salem, Ahmed M., "Using Black-box Persistent State Manifest for Dependency Management in Patching and Upgrading J2EE Based Applications," IEEE International Conference on Information Reuse and Integration, 2005, pp. 518-523.*

* cited by examiner

| Opcodes | Error code | Resolution File | Resume after resolution |
|---|---|---|---|
| CMD1 | ERR001 | /co/feature/restab/mov_0010.txt | Yes |
| CMD1 | ERR002 | /co/feature/restab/mov_0011.txt | No |
| ... | ... | ... | .. |
| CMD2 | ERR0010 | /co/feature/restab /clv_0010.txt | Yes |
| CMD2 | ERR0011 | /co/feature/restab /clv_00A2.txt | Yes |
| ... | ... | ... | ... |

| | Opcodes | Error code | Resolution File | Resume after resolution |
|---|---|---|---|---|
| 432a | MOV | 0x0010 | /emc/lvm/resolution/mov_0010.txt | Yes |
| 432a | MOV | 0x0011 | /emc/lvm/resolution/mov_0011.txt | No |
| | ... | ... | ... | .. |
| 432b | CLV | 0x0010 | /emc/lvm/resolution/clv_0010.txt | Yes |
| 432b | CLV | 0x00A2 | /emc/lvm/ resolution/clv_00A2.txt | Yes |
| | ... | ... | ... | ... |

450a..n  452a..n  454a..n

Figure 13 storage state file

| Field in the State file | Brief Description |
|---|---|
| Index | Index of the last successful command in the command Array. |
| To_LVMtable_checksum | Checksum of target "LVMtable file" which is shipped with new update. |
| To_LVMtable | Pathname of the target "LVM table file" |
| From_LVMtable_checksum | Checksum of present "LVM table file" which is already existing prior to starting this LVM deployment operation. |
| From_LVMtable | Pathname of already installed "LVM table file". |
| Device_map_dir | Pathname of directory where product-specific device map is located. |
| Storage Command_file_checksum | Checksum of the storage command file which is used for this LVM deployment operation. |
| Storage Command_file | Pathname of the storage command file which is used for this LVM deployment operation. |
| Mode | Install/upgrade/recover operation where this LVM deployment is happening as part of. |
| Platform | Product-specific fields |

FLEXIBLE STORAGE APPLICATION DEPLOYMENT MECHANISM

FIELD OF THE INVENTION

The present invention relates generally to software installation and upgrades. More particularly, the invention relates to installation and upgrading software in systems wherein multiple versions of the software are available.

BACKGROUND

Today's data centers store ever-larger amounts of business critical data that must be immediately and continuously available, and highly reliable. Information technologists, storage managers, and administrators of storage systems work continuously to support the increasing software operating system, support, and management requirements of these growing systems. As the capacity, performance, and reliability of systems grows, operating system (OS) and application capabilities and requirements grow concomitantly. System specific OS and/or application upgrades are continually developed to operate, support, and manage the ever more complex systems.

Eventually, after many versions of OS and/or application upgrades have been developed, there are products distributed throughout the world that may have installed thereon one of many different versions the OS and/or applications. Therefore, when it is time to upgrade a product to a current version of OS and/or applications, the upgrade must transition the product from one of many possible old product configurations. It is inconvenient to require a separate product upgrade mechanism for each permutation of old product configuration to new product configuration.

SUMMARY

In one aspect, the invention provides a method of deploying software in a system where multiple versions of the software are available. The method includes storing information representing the version of software that is being installed, the version of software being installed having an updated feature. It also includes providing groups of commands, each group of commands enabling the transition from a present version of the software to another version of software having another version of the feature. A state machine is executed that consults the stored information to access one or more groups of commands. The one or more groups of commands are executed to transition from the present version of the software to the version of software that is being installed having the updated feature. If an error occurs during the execution of the at least one group of commands, then recovery information is stored including errors, each error associated with a remediation group of commands. If the error is present in the recovery information, the remediation group of commands is executed.

Executing a state machine that consults the stored information to access one or more groups of commands can include comparing the stored information to current information representing the present version of the software currently installed in order to ascertain which of the one or more groups of commands should be executed.

Furthermore, each group of commands may be associated with header information. The commands in a group are executed if the group's header information indicates that the commands in the group are associated with a version of the software having a newer feature than the present version of the software.

In accordance with an embodiment, each command in each group of commands is a pseudo-command translatable to a programming language.

Also in accordance with an embodiment, the feature is related to partitioning of logical volumes for storage management. Further, if the error is present in the recovery information, the remediation groups of commands are executed and then the state machine return to a previous command of the at least one group of commands during which the error occurred.

In another aspect, the invention provides a computer program product. The computer program product includes a computer useable medium having computer readable program code embodied therein. The computer program product includes a table for storing information representing the version of software that is being installed. The version of software being installed has an updated feature. The program product also includes a file for storing a plurality of groups of commands. Each group of commands enables the transition from a present version of the software to another version of software that has another version of the feature. The program product also includes a state machine that consults the stored information to access one or more groups of commands. The program product includes logic for executing the one or more groups of commands to transition from the present version of the software to the version of software that is being installed that includes the updated feature. The program product also includes logic for performing the following steps if an error occurs during the execution of the at least one group of commands: storing recovery information including errors, each error associated with a remediation group of commands; and if the error is present in the recovery information, executing the remediation group of commands.

The program product state machine that consults the stored information to access one or more groups of commands may further include logic for comparing the stored information to current information representing the present version of the software currently installed in order to ascertain which of the one or more groups of commands should be executed.

Each group of commands in the program product may be associated with header information. The program product logic for executing the one or more groups of commands executes the commands in a group if the group's header information indicates that the commands in the group are associated with a version of the software having a newer feature than the present version of the software.

In accordance with an embodiment, each command in each group of commands in the program product is a pseudo-command translatable to a programming language.

Further in accordance with an embodiment, the feature of the program product is related to partitioning of logical volumes for storage management.

Further, in the program product, if the error is present in the recovery information, executing the remediation groups of commands further includes logic for returning to a previous command of the at least one group of commands during which the error occurred.

In accordance with a more particular aspect of the invention, a method is provided for deploying software in a storage system where multiple versions of the software are available. The method includes storing information representing the version of software that is being installed. The version of software being installed implements updated logical volume management partitions. A plurality of groups of commands are provided. Each group of commands enables the transition from a present version of the software that may not implement logical volume management partitions or may implement an old version of logical volume management partitions to another version of software having another version of logical volume management partitions. A state machine is executed that consults the stored information to access one or more groups of commands. The state machine compares the stored information to current information representing the present version of the software currently installed in order to ascertain which of the one or more groups of commands should be executed. The one or more groups of commands are executed to transition from the present version of the software to the version of software that is being installed having the updated logical volume management partitions. If an error occurs during the execution of the at least one group of commands, then recovery information is stored including errors, each error associated with a remediation groups of commands. If the error is present in the recovery information, the remediation group of commands is executed.

Each group of commands may be associated with header information, and the commands in a group are executed if the group's header information indicates that the commands in the group are associated with a version of the software that has newer logical volume management partitions than the present version of the software. Each command in each group of commands may be a pseudo-command translatable to a programming language.

BRIEF DESCRIPTION OF THE DRAWINGS

The advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 5 is an exemplary representation of an error information file used by the upgrade software of the invention.

FIG. 13 is an exemplary representation of an error information file used by the upgrade software of the invention.

FIG. 15 is an exemplary representation of a storage state file produced by the storage state file of the invention.

DETAILED DESCRIPTION

In general terms, the invention has been developed in order to deploy software in a system where multiple versions of the software are available, and wherein each version of the software may or may not employ a version of a feature. Accordingly, information is stored representing the version of software that is being installed, the version of software being installed having an updated feature. The software can be any software application or operating system (OS) in any type of system including but not limited to servers, networking systems and storage systems. The feature may be any feature of the software including but not limited to memory management, storage management, network management, application features and/or management, and the like. Groups of commands are provided, each group of commands enabling the transition from a present version of the software to another version of software having another version of the feature. A state machine is executed that consults the stored information to access one or more groups of the commands. The one or more groups of commands are executed to transition from the present version of the software eventually to the version of software that is being installed having the updated feature. Thus it may be that several groups of commands are executed, each group of commands transitioning from one version of the feature to another, until the transition is complete from the present version of the software to the version of software that is being installed having the updated feature. If an error occurs during the execution of the at least one group of commands, then recovery information is stored including errors, each error associated with a remediation group of commands. If the error is present in the recovery information, the remediation group of commands is executed.

In this way, groups of commands can be executed as needed to automatically upgrade software that either lacks a feature or has an old version thereof to an updated version thereof. Error protection and recovery reinstatement is further provided.

Figure 1:
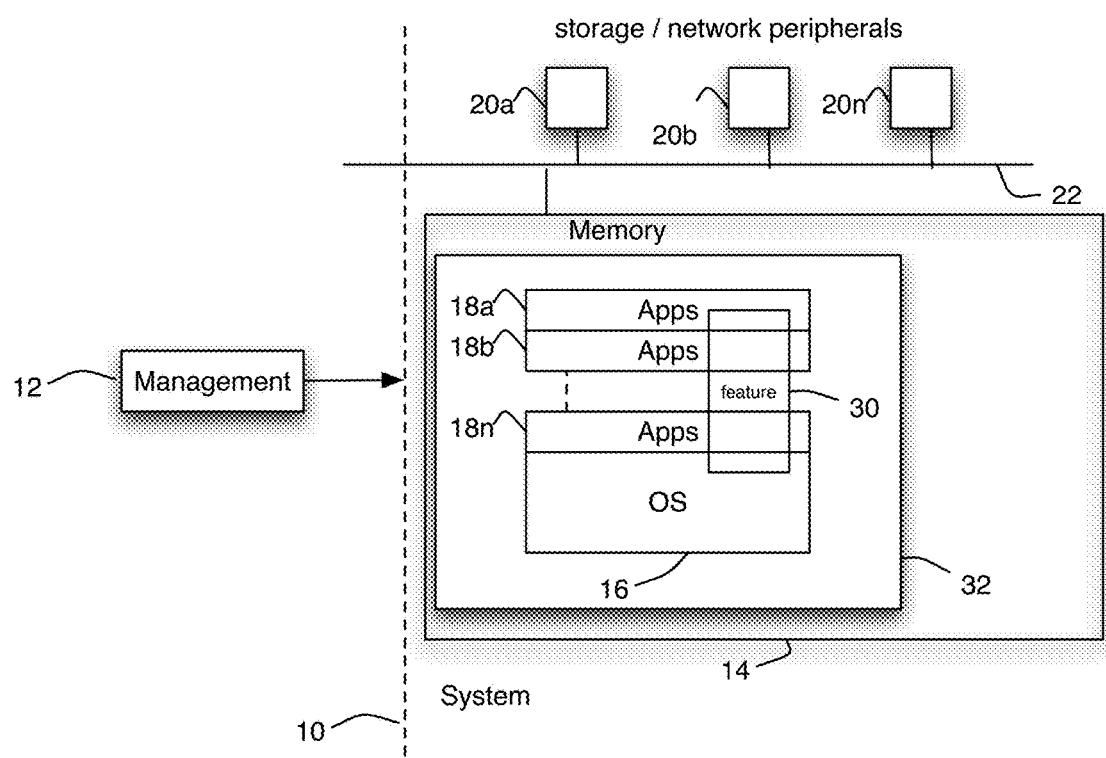
FIG. 1 is a functional block diagram of an embodiment of a general system including an OS, applications, and a feature that may reside in the applications or OS.

In FIG. 1 there is shown an embodiment of a system in which aspects of the invention may be deployed. Shown is a system 10 coupled to a management entity 12. The system 10 includes memory 14, wherein an operating system (OS) 16 resides. Applications 18*a* . . . 18*n* run on the OS 16. Storage and network peripherals 20*a* . . . *n* are also shown within the system 10, coupled to the memory 14 via a channel or network 22. The system 10 may be, for example, a stand-alone server wherein the system 10 is a server enclosing a memory 14 and storage and network peripherals 20*a* . . . *n* such as internal disk drives and network controllers coupled the memory 14 via a bus such as a PCMCIA bus or USB or fibre channel storage connection. Or, the system 10 may be, for example, a large distributed system wherein the memory 14 is a server itself, and each storage peripheral 20a . . . n and network peripheral 20a . . . n is coupled to the memory 14 via an external connection such as a storage connection like a Fibre Channel connection, or a network connection such as an Ethernet or optical connection, or a high speed channel like Infiniband, or the like. The channel or network 22 may thus consist of several different layers of channel and network connections, and the system 10 may be integrated or distributed. The invention scales across all such architectures. FIG. 1 is shown for simplicity of description of the broad applicability of the invention.

As shown, within the system memory, one or more of the applications 18a . . . n and/or the OS 16 supports a feature 30 within the bounds of system software 32. The feature 30 is shown in FIG. 1 as overlapping the several layers of applications and the OS because, in accordance with the broad nature of the invention, the feature addressed by the invention may reside within an application, or within the OS, or may reside across a stack including the OS and layers of applications.

In any system such as that shown in FIG. 1, it is often necessary to upgrade systems in the field (that is, for example, systems that reside in customer use or systems that are ready to ship to customers) that presently do not contain the feature so that they now do. Or, it is often necessary to upgrade a present software package 32 including the OS and/or applications that include the feature 30 to implement a new available version of the feature 30. Eventually, after much upgrading of multiple platforms of systems, and multiple versions of the software 32 containing the feature, there are lots of different versions of the feature 30 present in the field.

Examples of OS may be for example and without limitation Linux, UNIX, and/or Microsoft Windows. Examples of applications may be for example any networking, storage, or user applications that run on these OS. Examples of features may be memory cache sizing, partitioning, or other configuration utilities, storage static or dynamic partitioning or other configuration utilities, or network configuration utilities for use by an OS or application, or the like.

Previously, when features 30 of software 32 were in need of upgrade, an upgrade package would be provided that would upgrade the software 32 from the present version directly to the new version. But it is inconvenient to provide separate upgrade software for every permutation of feature upgrade possibilities when so many different present versions of the software containing the feature may exist in the field.

Figure 2:
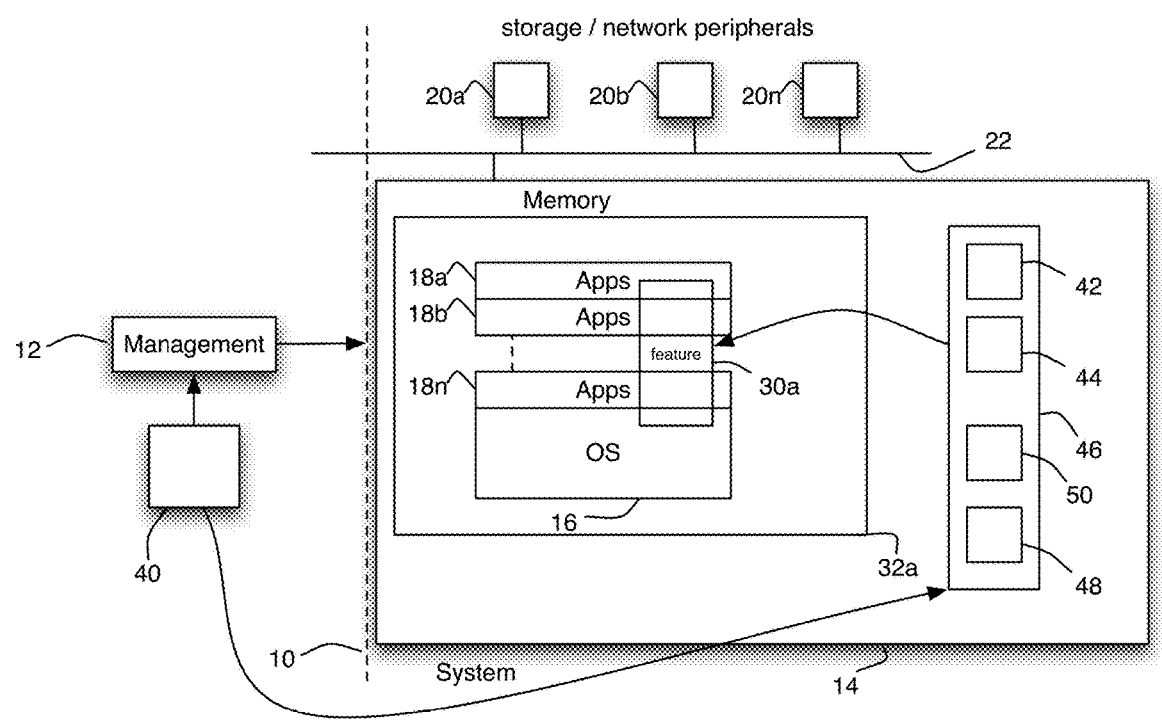
FIG. 2 is a modification of the block diagram of FIG. 1 wherein the upgrade software of the invention is employed to add or update the feature.

Thus, the invention is provided for deploying a version of software 32a. As seen in FIG. 2, Install/Upgrade software 40 is deployed via management station 12. This may be done by a user via a terminal attached to the management station 12, or via remote download through the management station 12, or via other known ways. The Install/Upgrade software 40 (hereinafter upgrade software 40) loads into memory 14. The Install/Upgrade software 40 (hereinafter upgrade software 40) deploys an information file 42 and a command file 44, and may include an error information file 48. The information file 42 includes information representing the version of software that is being installed—including information about the feature associated with new software being installed. The command file 44 includes groups of commands. Each of these groups of commands enables the transition from one present version of the software 32 to another version of the software 32a. A state machine 46 consults the information file 42 and the command file 44 in order to access one or more groups of the commands in the command file 44 to transition from the present version of the software 32, that may either not have the feature 30a, or may have an old version 30 of the feature 30a, to the version of software 32a that is being installed that has the new feature 30a. If an error is encountered during this process, the error information file 48 may be accessed to attempt to recover and continue the operation. The state machine 46 employs a state file 50 in order to keep persistent state during an installation, recovery, or upgrade operation.

Figure 3:
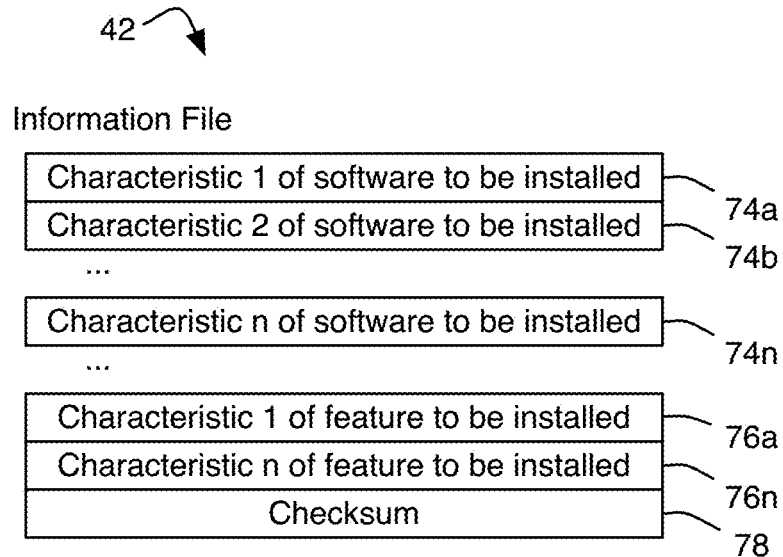
FIG. 3 is an exemplary representation of an information file used by the upgrade software of the invention.
Figure 4:
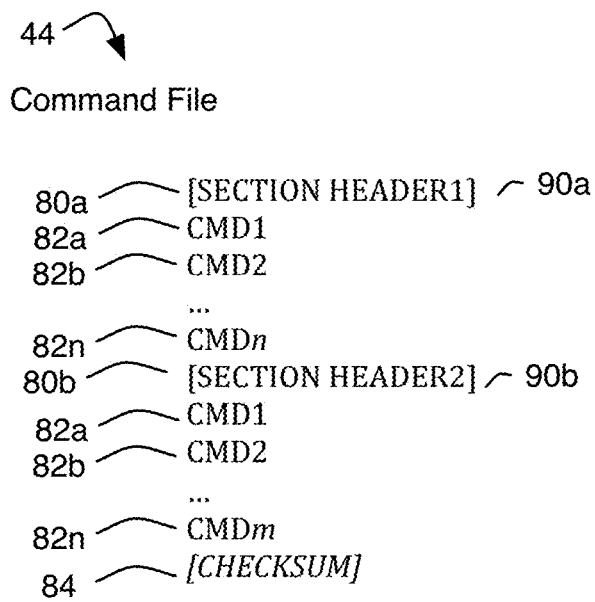
FIG. 4 is an exemplary representation of a command file used by the upgrade software of the invention.

Examples of embodiments of the files employed by the upgrade software 40 are shown in FIGS. 3 and 4, and 5. Referring to FIG. 3, there is shown an example of an information file 42. The information file 42 is embodied herein in the form of a table. The table lists a number of characteristics 74a . . . n of the software to be installed. The table also lists a number of characteristics 76 a . . . n of the feature of the software to be installed. A checksum 78 is used by the state machine 46 to verify the integrity of the information file 42.

In FIG. 4 there is shown an example of a command file 44. The command file 44 is shown as divided into sections 80a . . . n (80a and 80b shown). Each section 80 a . . . n contains a list of commands 82a . . . n, although a section may contain only one command 82. A checksum 84 is used by the state machine 46 to verify the integrity of the command file 44.

Each section 80a . . . n contains a command or group of commands 82a . . . n that enables transition from one present version of the software to another version of the software. That is, one section 80, for example section 80a, may contain commands 82 that enable transition from a version of the software that does not include the feature to a version of software that does include the feature. Another section 80 for example section 80b, may contain commands that enable transition from a version of software that contains an older version of the feature to a version of software that contains a newer version of the feature. Another section 80 may contain commands that enable transition to a version of software that contains an even newer version of the feature. Multiple sections of the command file 44 can be executed to perform multiple version upgrades of the feature, as will be seen.

In accordance with an aspect of the invention, each command in each section of the command file 44 is a pseudo-command or opcode. The opcode is independent of, and translatable to, underlying computing code. For instance, CMD A may translate to a set of linux code that relates to moving data. CMD B may translate to a set of linux code that relates to sizing an area of storage. Or, CMD A could mean move data but be translated to a different OS, or programming code, instead. That is, the opcode is independent of, and translatable to, underlying computing code at several different layers. It could be translatable to different OS, or translatable to different programming languages. The generic nature of the opcodes in the command file 44 offers flexibility and broad application of the invention. Opcodes can be chosen and implemented in accordance with business needs.

Referring back to FIG. 2, an embodiment of the error information file 48 takes the form of a table similar to the command file 44. This table may be loaded along with the upgrade software 40, or it may be loaded later, for instance when an error occurs. An error information file 48's content is similar to the format of a command file 44 as described previously. An example of an error information file 48 is shown in FIG. 5. It consists of command opcodes (for example 82a, 82b) and corresponding specific error codes (112a . . . n). The location of a resolution file 114a . . . n is listed for each error code 112a . . . n. Each resolution file 114a . . . n consists of command opcodes 116a . . . n as the operation "instructions" that are specific to resolving a given unique error code 112. "Resume after resolution" is a choice to indicate to the state machine 46 to retry the original opcode 82 upon executing the instructions as noted in the resolution file 114. These fields of the error information file 48 are used by the state machine 46 as further described.

Figure 6:
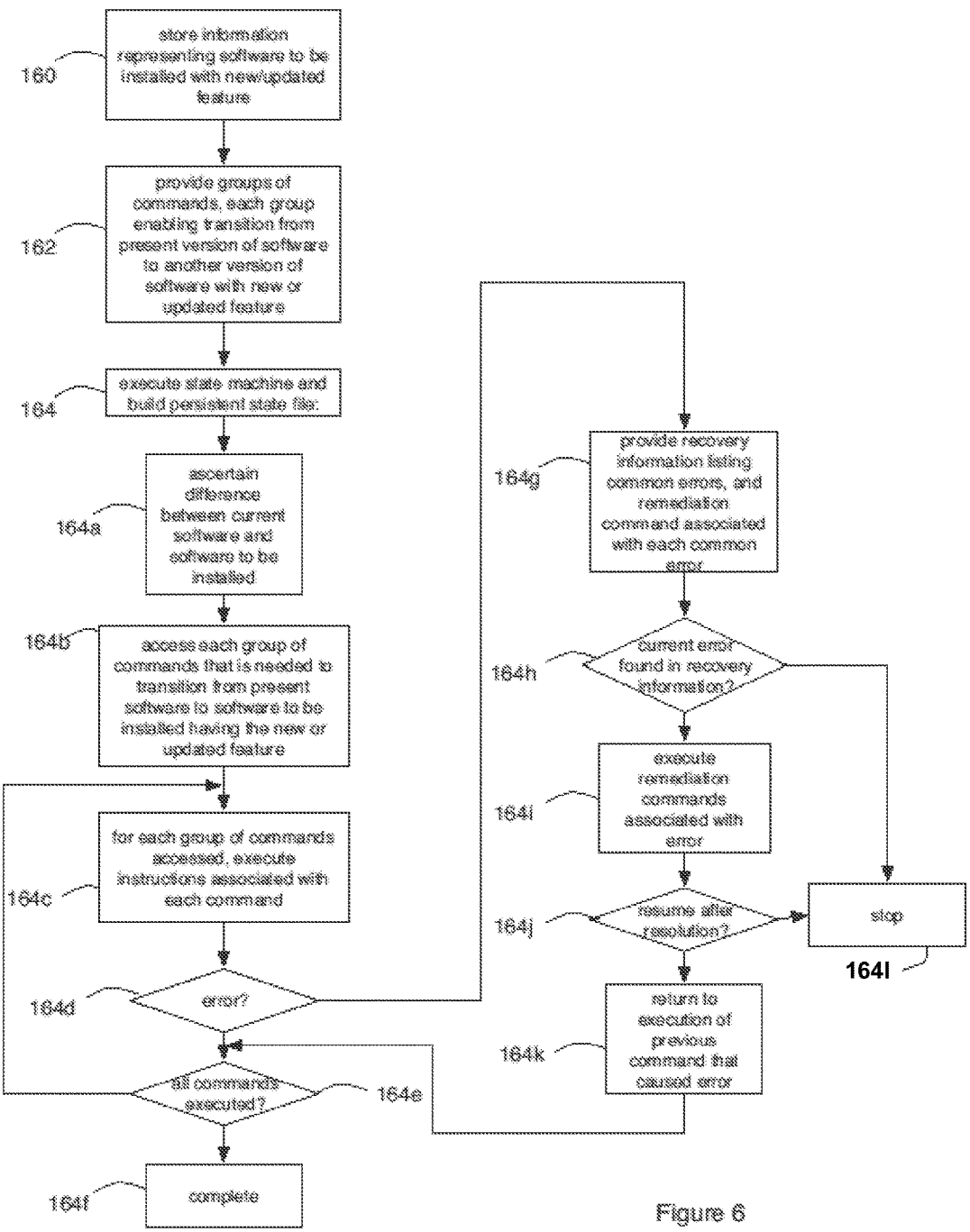
FIG. 6 is a flow diagram demonstrating the operation of the upgrade software of the invention in a general system.

Referring now to FIG. 6, there is shown the method by which state machine 46 utilizes the files 42, 44, and 48 to implement the invention. Please note that the following steps need not be performed in the order presented, as long as the files are instantiated before the state machine is executed. Accordingly, in step 160, information is stored representing software 32a to be installed with a new or updated feature 30a. This information is stored in the information file 42. Then (step 162) groups of commands are provided in a command file 44, each group enabling transition from a present version of the software 32 to another version of the software 32a with a new or updated feature 30a. Then (step 164) the state machine 46 is executed and the state file 50 is created or accessed. If the software is being installed for the first time, the state file 50 will be created. If the state machine is being invoked after a system reboot or recovery, or after facing an error during an installation or upgrade operation, then an already existing state file will be accessed.

The state machine process is shown from steps 164a through 164l. In step 164a, the state machine 46 ascertains the difference between the present software 32 and the software 32a to be installed (if present software exists). The state machine then accesses each group of commands in the command file 44 that is needed to transition from the present software 32 to the software 32a to be installed in order to implement the new or updated feature 30a (step 164b). For each group of commands accessed, instructions are executed associated with each command (step 164c).

In accordance with a further aspect of the invention, errors are monitored (step 164d). If no errors occur, and all instructions associated with each group of commands have been executed (step 164e), the install/upgrade process is complete (step 164f). If commands remain, the process repeats from step 164c until all commands have executed (164f) or an error is encountered (164d). If, during the process, an error is encountered (step 164d), the error information file is consulted (step 164g). The error information file may have been loaded along with the upgrade software, or may be loaded after the error is encountered. The error information file 48 (FIG. 5) includes information listing common errors (112a . . . n) and remediation commands associated with each common error (114a . . . n) (step 164g). If the error is found in the error information file for the command executed at step 164c (step 164h), the remediation commands associated with the error are performed (step 164i). Then the resume after resolution field 116 in the error information file 48 associated with the error 112 is checked. If this field indicates that the command should be resumed, then the process returns to executing commands from step 164c (or step 164e), where the installation/upgrade may be continued from the command in the command file that caused the failure (step 164j). If the error is not found (step 164h), the installation/upgrade is stopped in expectation of manual intervention (step 164l).

The state machine 46 employs a state file 50 (step 164) in order to keep persistent state during an installation, recovery, or upgrade operation. For example, it can handle rebooting of a system (voluntarily or involuntarily), and continue the remaining operation. This allows the operation to persist even while the process requiring a system reboot continues.

Figure 7:
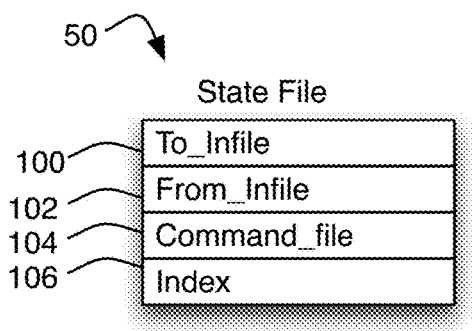
FIG. 7 is an exemplary representation of a state file produced by the state machine of the invention.

Referring to FIG. 7, there is shown an example of a state file 50. The state file 50 is produced by the state machine 46 and keeps track of the execution of commands in the command file 44. This is achieved by keeping the following information in a persistent file which will exist through out the operation.

A pointer to the information file that describes the present state of the software is stored in the "from_infile" field 100. A pointer to the information file that describes the information file including the version of software containing the new or upgraded feature 30 (i.e. the information file 42) is stored in the "to_infile" field 102. The "command file" field 104 contains the location of the command file 44. The "Index" field 106 indexes the last successful command in a command array, as will be further described.

Referring back to FIG. 6, as part of step 164c, the state machine determines the applicable groups of commands 80 within the command file 44 that must be run to install or upgrade the feature 30a from information in the information file 42, command file 44, and state file 50. Using these groups 80, the state machine then forms a command array 110 (FIG. 8) containing all the applicable commands to be executed for this operation. It will then run through these commands from the command array 110 sequentially. And as it goes through this list, it updates the Index field 106 in the state file 50 upon successfully completing that command.

More particularly, the state of the present software 32 and feature 30, pointed to by the "From_Infile" pointer 102, may be an older version of the information file 42, or it may be information that the state machine gathers upon installation. As further shown in FIG. 4, each group of commands 80a . . . n in the command file 44 may be associated with header information 90a . . . n. In accordance with an embodiment, the commands in a group are executed if the group's header information 90 indicates that the commands in the group are associated with a version of the software 32a that has a newer feature 30a than the present version of the software 32. The header information 90a . . . n also servers to filter out or exclude the commands that do not apply to the version of software being installed. Thus it may be that, based on examination of group headers 90a . . . n, several groups of commands 80a . . . n are executed, each group of commands transitioning from one version of the feature to another, until the transition is complete from the present version of the software 32 to the version of software 32a that is being installed having the updated feature 30a.

For example, version 1.1 of the software may not contain feature 30, but version 1.2 may contain the feature 30. Command group 80a of the command file includes the commands necessary to install the feature 30 to upgrade from version 1.1 to version 1.2 of the software. So to upgrade from version 1.1 to version 1.2, group 80a of the command file 44 must be executed. As another example, version 1.2 of the software 32 includes the feature 30, and version 1.3 includes a different version of the feature, but version 1.4 includes yet another version of the feature. In order to upgrade from version 1.2 to version 1.4, groups 80 b, c, and d, (b shown, c, d not shown) which correspond to software versions 1.2, 1.3, and 1.4, are executed. As a further example, there may be instances where software needs to be upgraded from a version 1.3 to a version 2.2. In this case, according to an embodiment, only groups 80 corresponding to versions 2.a . . . n would be executed. First, the software 32 would be updated to version 2.0. Then that software would be updated to versions 2.1 and 2.2 in accordance with the contents of the command file 44. In all cases, the sections 80 that should be executed are identified by comparing information in their corresponding headers 90a . . . n to the information pointed to by the "From_Infile" pointer 102. Information in the headers 90a . . . n can identify whether each corresponding group should be included as part of the install, upgrade, or recovery, or excluded as not needed or relevant.

Figure 8:
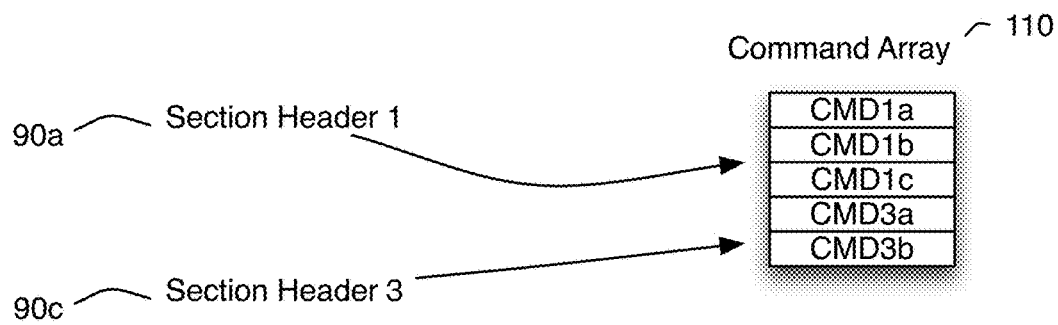
FIG. 8 is an exemplary representation of a command array produced by the state machine of the invention.

In accordance with a further aspect of the invention, once the sections of the command file 44 are identified, a command array 110 is assembled by the state machine. Referring to FIG. 8, an example of such a command array 110 is shown. In this case, section headers 1 and 3 (90a and 90c) indicate that the commands in these sections are associated with a newer feature 30a than the feature 30 installed with the present software 32. So, the commands 82a . . . n from sections 1 (90a) and 3 (90c) are gathered into an array 110. The commands associated with header 90a are shown as CMD1a, CMD1b, and CMD1c. The commands associated with header 90c are shown as CMD3a and CMD3b. Now that these commands are consolidated into a command array 110, they can be executed in order to perform the upgrade from the present software 32 to the updated software 32a including the updated feature 30a.

As previously described with reference to FIG. 5, in accordance with an aspect of the invention, an error information file 48 provides new instructions, or opcodes, can be "loaded in" which are not part of the original resident codes in the command file. More particularly, the error information file 48 consists of command opcodes (for example 82a, 82b) and corresponding specific error codes (112a . . . n). The location of a resolution file 114a . . . n is listed for each error code 112a . . . n. Each resolution file 114a . . . n consists of command opcodes 116a . . . n as the operation "instructions" that are specific to resolving a given unique error code 112. "Resume after resolution" is a choice to indicate to the state machine 46 to retry the original opcode 82 upon executing the instructions as noted in the resolution file 114. This opcode 82 is the opcode in the command array 110 that produced the error from step 164d (FIG. 6). For those opcodes 82 that are not listed in this table, if an error is found when executing a given opcode 82, the default operating behavior would still apply, which is stop at the point when fault is found, and expect manual intervention by users (e.g. to retry the attempt).

The invention is now set forth with regard to a particular embodiment in a storage application wherein the feature is related to volume partitioning. In this application, the invention is used to install or upgrade Linux Logical Volume Management (LVM) partitions in a storage system.

Figure 9:
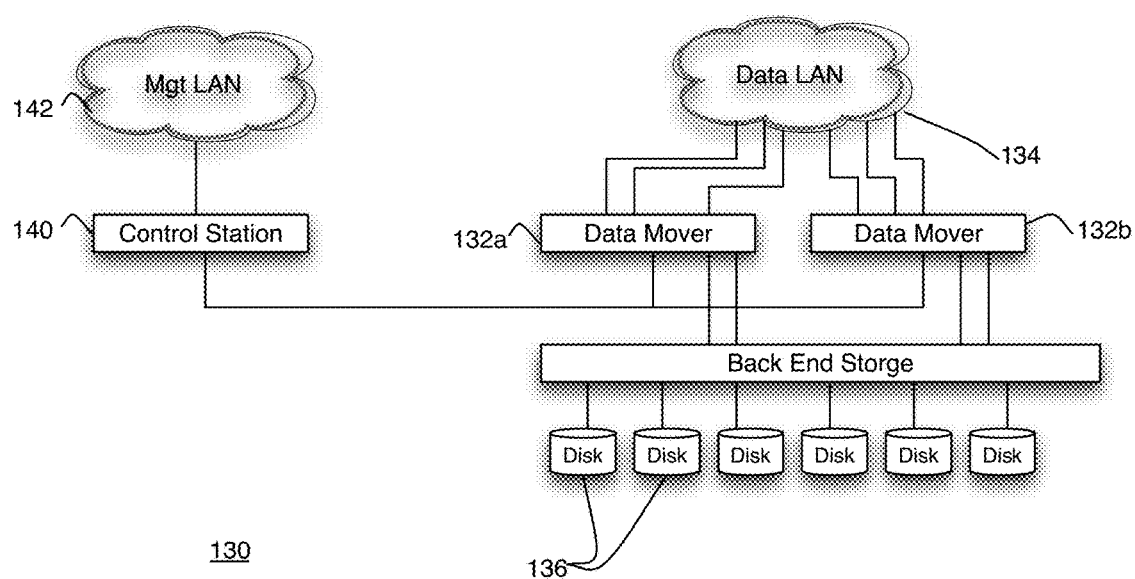
FIG. 9 is a functional block diagram of one version of a Celerra Storage System.

An example of such a storage system in which the invention can be employed is the Celerra® product family from EMC Inc. of Hopkinton, Mass. The Celerra product family covers a broad range of configurations and capabilities that scale across all ranges of networked storage, NAS, SAN, etc. The family consists of common building blocks. An example of one configuration of a Celerra system 130 is shown in FIG. 9.

As shown, Data Movers 132a,b move data back and forth between a LAN 134 and back-end storage (disks) 136. The Control Station 140 (CS) is the management station for the system. The Celerra storage system 130 is configured and controlled via the Control Station 140. The CS 140 is shown coupled to a management LAN 142, from which the CS software may be downloaded. The management LAN 142 may be connected to the data LAN 134 and/or the Internet.

Figure 10:
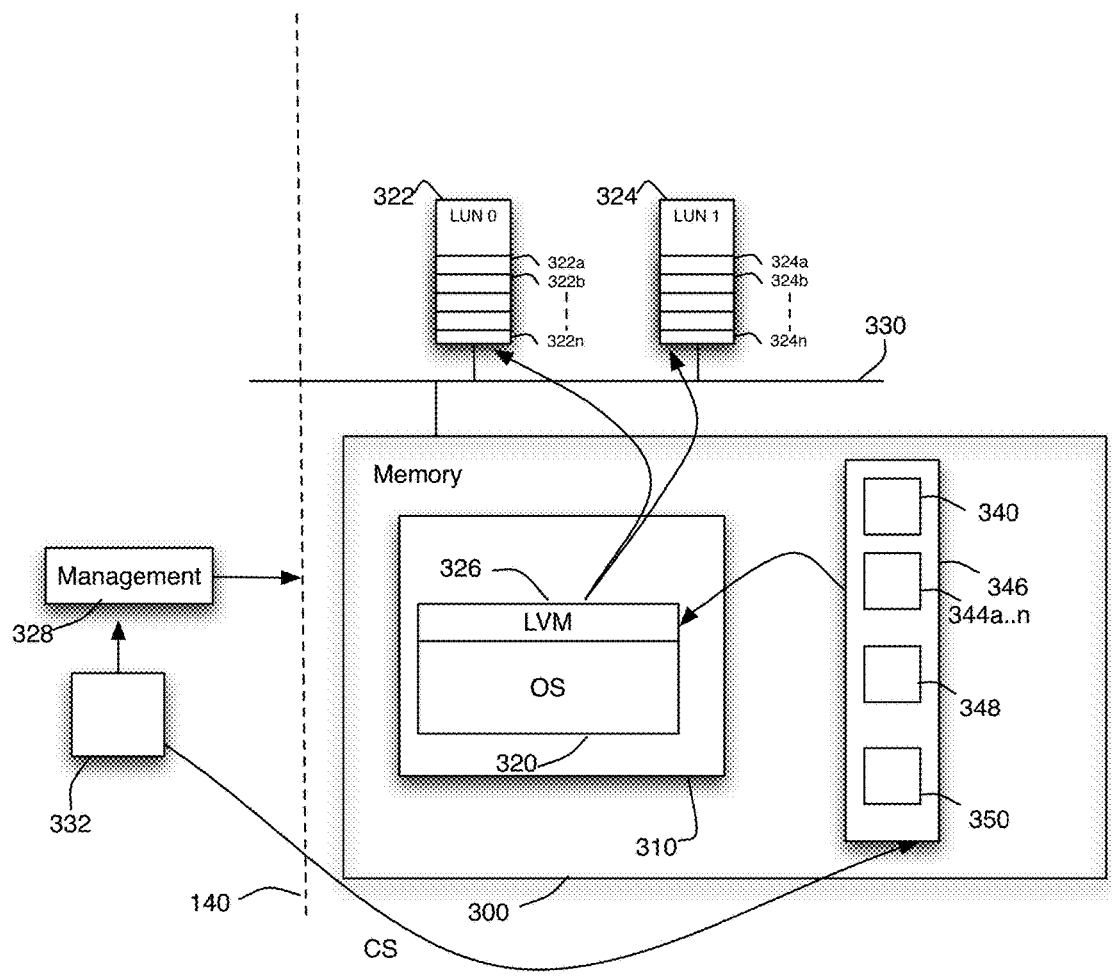
FIG. 10 is a functional block diagram of an embodiment of a storage system wherein a control station implements an OS and logical volume management, and the upgrade software of the invention.

The invention can be embodied in the Control Station (CS) 140, or other such storage system control units. A general example of a storage CS that can operate in many storage systems including Celerra is shown in FIG. 10. Control Station 140 runs an OS 320 relies on internal Logical Units (LUNs), referred to as Control LUNs 322 and 324, for storage of runtime database and configuration information. The Control LUNs are herein shown disposed within the CS and connected to the memory 300 via a channel 330, but they may reside anywhere in a storage system. Originally, these Control LUNs were physically partitioned into partitions 322a . . . n, and 324a . . . n, which were fixed in size. Over time, growing business demands required that physical partitions on the Control LUNs be expanded. Thus subsequent releases of Control Station 140 software required that larger physical partitions or additional instances of Control LUNs 322a . . . n, and 324a . . . n, be defined. Static definition of physical partitions on the Control LUNs thus met with a scalability issue.

Linux Logical Volume Manager (LVM) 326 was then employed to replace the statically defined physical partitions 322a . . . n, and 324a . . . n. However—this presented a set of upgrade issues regarding how to deploy LVM partitions effectively for all storage platforms. First of all, different generations of hardware platforms have different control LUN layouts. Further, during upgrades, platforms may need to be converted from physical partitions (that do not employ LVM partitions at all) to LVM partitions, or from smaller LVM partitions to larger ones, or from fewer LVM partitions to a larger number of partitions.

However, as described previously, it is inconvenient to provide a separate software install or upgrade package for every possible LVM configuration upgrade combination. The invention as described broadly above is thus embodied in a storage CS 140 with regard to LVM partitioning. It is understood by the learned practitioner, however, that any system (storage or not) embodying LVM partitions can employ the invention thus.

Referring again to FIG. 10, the CS 140 is shown coupled to a management entity 328. As previously described with regard to the general system, the management entity 328 may be a user terminal attached to the CS 140, or may be a terminal attached via the management LAN 142, or may be an application operating via remote download through the management entity 328, or via other known ways. The control system 140 includes memory 300, wherein CS software 310 resides. The storage LUNs 322 and 324 are also shown within the CS system 140, coupled to the memory 300 via a channel or bus 330. In Celerra the LUNs are connected to the CS 140 but in general they may be located internally or externally to a storage control system. The CS software 310 employs an OS 320. The OS 320 is shown to employ LVM 326 for logical partitioning of the LUNs 322 and 324 into partitions 322a . . . n, 324a . . . n respectively.

As mentioned, storage system upgrades must handle all platform types, as well as various permutations of software upgrade from-to versions pairing. For instance, a system that uses physical partitions rather than LVM partitions may need to be upgraded to support LVM partitions. Or, a system that uses LVM partitions may need to be upgraded to a different number of LVM partitions, or different sized LVM partitions. Thus it is necessary to support each software version that could potentially add, expand, change, decommission, or retire LVM partitions.

Thus, the invention is provided for deploying a version of CS software 310. As seen in FIG. 10, Install/Upgrade software 332 is deployed in memory 300 via management entity 328. This may be done by a user via a terminal attached to the management entity 328, or via remote download through the management entity 328, or via other known ways. The Install/Upgrade software 332 (hereinafter storage upgrade software 332) is shown to include a storage information file 340, at least one storage command file 344, a state machine 346, and may include a storage error information file 348. The state machine 346 consults the storage information file 340 and a storage command file 344 in order to access one or more groups of the commands in the storage command file 344 to transition from the logical volume management layout to the updated logical volume layout. If an error is encountered during this process, the storage error file 348 may be accessed to attempt to recover and continue the operation. The state machine 346 employs a state file 350 in order to keep persistent state during the operation.

The storage information file 340 includes information representing the version of software that is being installed—including information about the feature associated with new software being installed. In this case, the storage information file 340 includes information about LVM partitions. The storage information file 340 defines the final logical volume partition layout that represents a software version. The storage information file 340 will be the database referred to while creating and modifying the logical volumes for the software being installed.

Figure 11:
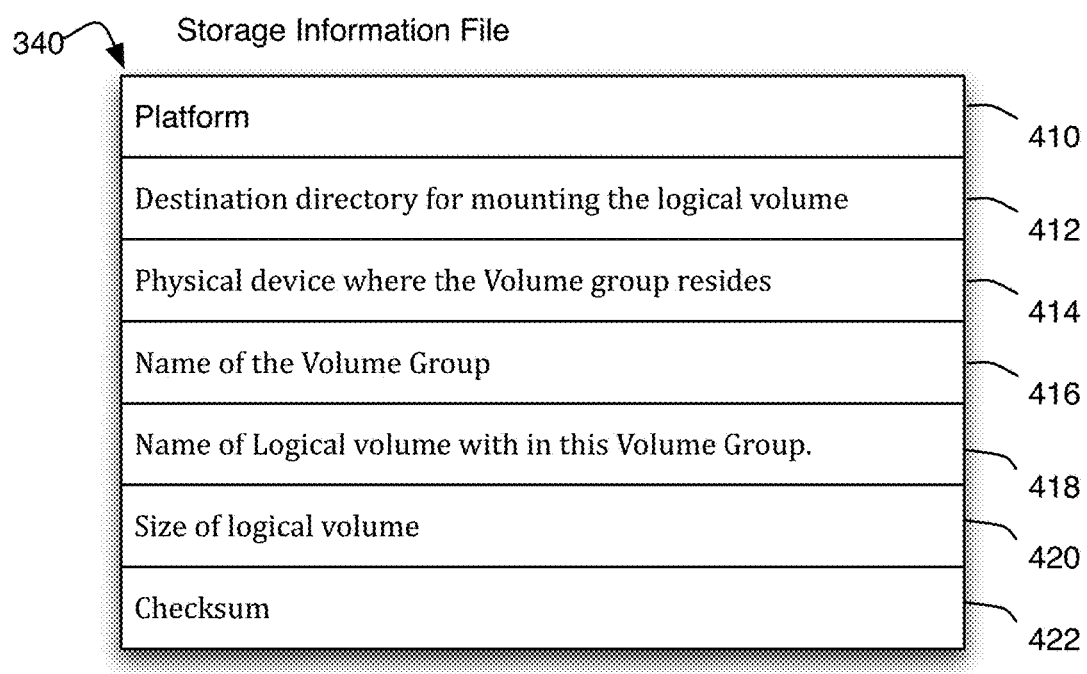
FIG. 11 is an exemplary representation of a storage information file used by the upgrade software of the invention.

Referring to FIG. 11, there is shown an example of a storage information file 340, more particularly referred to as an LVM table 340. The LVM table 340 defines the final logical volume partition layout for a given version of CS software 310. This table is an example of information that could be used by a storage system to define the Logical Volumes that are to be laid out or modified on the system. The table 340 includes the fields particular to the embodiment shown herein as would be used in defining the feature of logical volume management, including the platform 410, the destination directory for mounting the logical volume (412), the physical device where the volume group resides (414), the name of the volume group (416), the name of the logical volume within this volume group (418), and the size of the logical volume (420). Also include is a checksum 422 that can be used by the state machine 346 to verify the integrity of the table 340.

One or more storage command files 344a . . . n are provided with install/upgrade software 332. Different command files 344 may be provided depending on the operation being performed. For example, one command file 344 may be used for installation operations, while another command file 344 may be used for a recovery operation, and yet another command file 344 may be used for an upgrade operation.

Each command file 344 includes groups of commands. Each of these groups of commands enables the transition from one present version of the software to another version of the software. The state machine that consults the storage information file 340 and the storage command file 344 in order to access one or more groups of the commands to transition from present logical volume management layout to the updated logical volume management layout.

Figure 12:
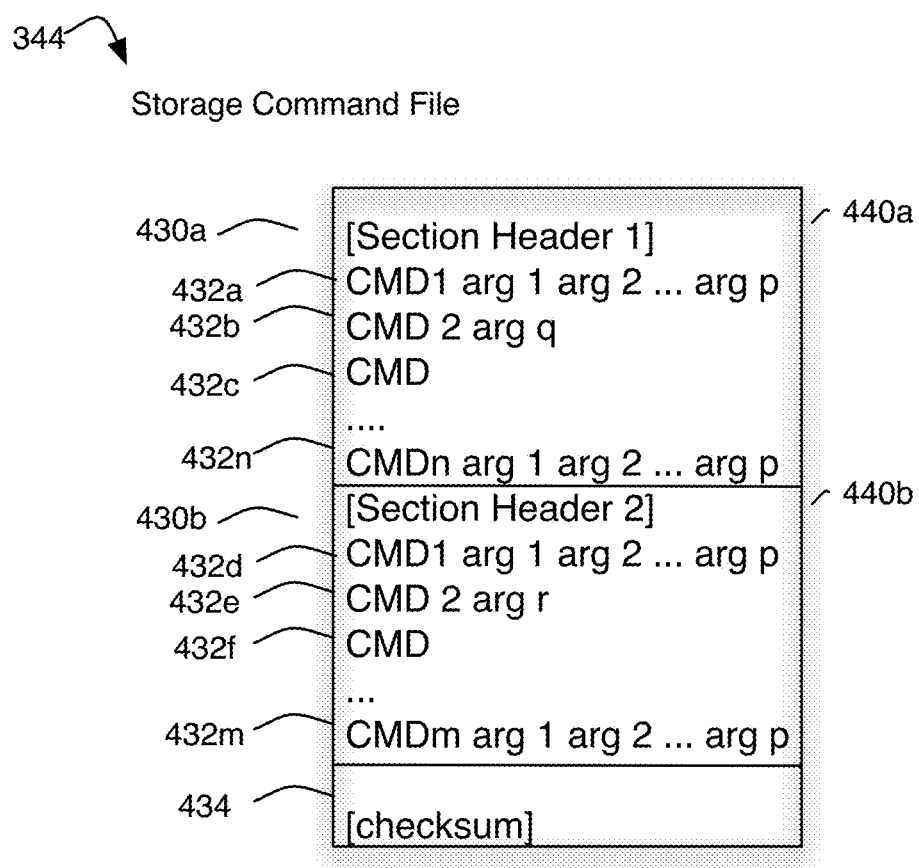
FIG. 12 is an exemplary representation of a storage command file used by the upgrade software of the invention.

In FIG. 12 there is shown an example of a storage command file 344. In order to support easily moving from one existing LVM layout to a new LVM layout (which is defined in an LVM table 340), a new command file 344 is divided into different sections 430. The format of the command file 344 is shown in FIG. 12. As seen commands are divided into sections 430a, 430b . . . 430n. Each of these sections 430 defines a set of commands 432a,b,c . . . n, 432,e,f . . . m to obtain the logical volume layout for every defined version of this software product.

Each section 430 contains a section header 440 (440a,b) including information indicating whether the commands 432 in the section 430 should be executed. The state machine 346 can determine which sections should be executed by taking the section header 440 information into consideration. The section header 440 information can include information related to hardware platform, a version number related to the storage information table version numbers, software version numbers, or any combination of the like that identifies the system on which the operation is happening. In accordance with one embodiment, if the version number on the present system software 310 is greater than the version identified in the section header 440, then that section will be skipped. In accordance with another embodiment, if the version number of the LVM partition feature 326 is greater than the version identified in the section header 440, then that section will be skipped.

Commands may be of varying types as required by business needs. A given command may have several arguments, for example as shown in CMD1 (432a). Or a command could have a single argument (432(b)) or no arguments (432(c)). In a particular embodiment, commands in the storage command file 344 come from a pre-defined pseudo LVM language or opcodes, which captures an LVM operation in a manner that is transparent from the underlying technology. Thus the underlying implementation of the LVM mechanism, which may be something like Linux software RAID, is rendered transparent and transportable, as was described generally for the broad system case presented above. Following are some of the defined commands in this pseudo language when deploying Logical Volume Management partitions:

CVG [volume group]

This command instantiates a volume group as described in the LVM table file 340. All of the information required to create this volume group is taken from the LVM table 340 for this volume. If the physical device that the volume group will reside on has not yet been initialized at the time that the volume group is created, it will be on the first invocation of this command.

CLV [logical volume]

This command instantiates a logical volume described in the LVM table 340 and mounts it on its designated mount point. All of the information required to create the logical volume is taken from the LVM table 340 entry for that logical volume. If the associated volume group does not exist at the time that this command is invoked, it will be created, and all preliminary steps to prepare the physical device for the volume group will be done at that time.

DVG [volume group]

This command deletes a volume group. If the volume group contains logical volumes, all steps required to safely delete the logical volumes will be taken first.

MOV [source directory] [target directory]

Moves the contents of the source directory to the target directory.

CLD [device name]

Initialize a block device for use as an LVM device, removing any partition tables that may be on the device first. This will completely destroy all data on the device and leave it in a state ready to be added to a volume group.

ELV [logical volume]

Increase the size of the logical volume to the size indicated in the lvmtab. This command has no effect if the size specified is less than or equal to the current size.

RLV [volume group] [old logical volume] [new logical volume]

Rename a logical volume.

CRF [volume group] [logical volume] [device name] [mount point] [size]

This creates a logical volume in the specified volume group of the specified size and mounts it on the specified mount point. Any partitions or data on the specified block device will be cleared during this operation. This command is useful for creating temporary staging logical volumes that are not part of the final layout described in the LVM table 340.

IFVG [volume group]

If volume group exists: Positive test whether the given volume group exists. Returns TRUE if it does and FALSE if it doesn't.

IFLV [volume group] [logical volume]

If logical volume exists: Test whether the given logical volume exists. Returns TRUE if it exists and FALSE if it doesn't.

Referring to FIG. 13, an embodiment of the storage error information file 348 takes the form of a table similar to the storage command file 344. This table may be loaded with the upgrade software 332, or it may be loaded later, for instance when an error occurs. A storage error information file 348's content is similar to the format of a storage command file 344 as described previously. It consists of command opcodes (for example 432a, 432b) and corresponding specific error codes (450a . . . n). The location of a resolution file 452a . . . n is listed for each error code 450a . . . n. Each resolution file 452a . . . n consists of command opcodes 432 as the operation "instructions" that are specific to resolving a given unique error code 450a . . . n. "Resume after resolution" 454a . . . n is a choice to indicate to the state machine 346 to retry the original opcode 432 upon executing the instructions as noted in the resolution file 452. These fields of the error information file 348 are used by the state machine 346 as further described.

Figure 14:
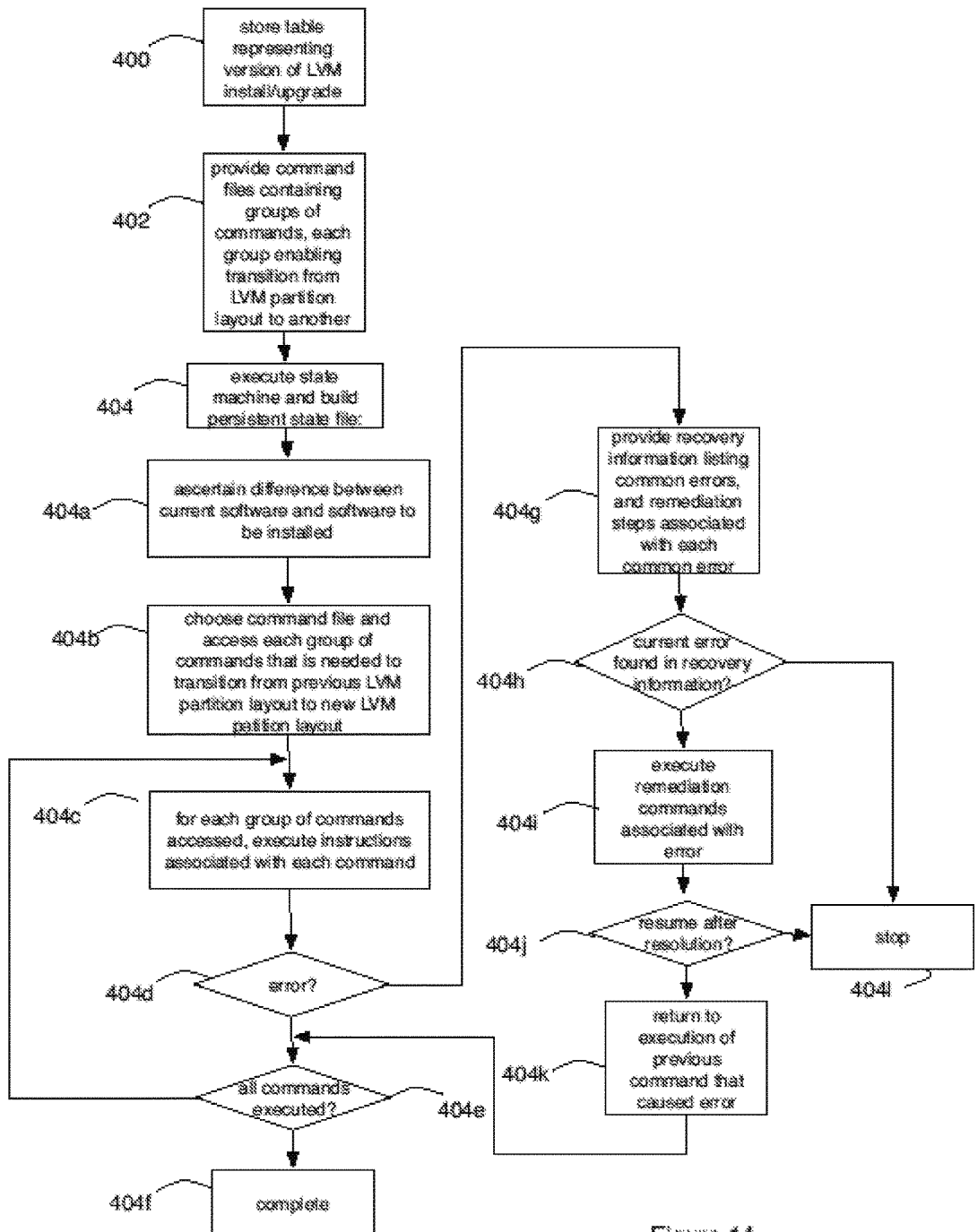
FIG. 14 is a flow diagram demonstrating the operation of the upgrade software of the invention in a storage system for upgrading logical volume management.

Referring now to FIG. 14, there is shown the method by which the state machine 346, the storage information file 340, the storage command file 344, and the storage error information file 348 are used to implement the invention. Please note that the following steps need not be performed in the order presented, as long as the files are instantiated before the state machine 346 is executed. Accordingly, in step 400, information is stored representing software to be installed with a new or updated version of a logical volume manager feature. This information is stored in the storage information file 340. Then (step 402) groups of commands are provided (via command files 344), each group enabling transition from a present version of the software to another version of the software with a different LVM partition layout. The storage state machine 346 is executed at step 404, and the persistent state file 350 is created or accessed. The operation of the state machine 346 is described in steps 404 a-l. The state machine 346 ascertains the difference between the present software being executed and the software to be installed (step 404a), and then accesses each group of commands that is needed to transition from the present software to the software to be installed in order to implement the new or updated LVM partition layout (step 404b). For each group of commands accessed (step 404c), instructions are executed associated with each command.

The process repeats from step 404c until all commands have executed (404e,f) or an error is encountered (404d). If an error occurs, the storage error information file is consulted (step 404g). The storage error information file 348 may have been loaded with the upgrade software 310, or may be loaded after the error is encountered. As previously described, the storage error information file 348 includes information listing common errors and remediation commands associated with each common error 450 for each command 432. If the error is found in the storage error information file for the command 432 executed at step 404c (step 404h), the remediation commands associated with the error are performed (step 404i). Then the resume after resolution field 454 in the error information file 348 associated with the error 450 is checked. If this field indicates that the command 432 should be resumed, then the process returns to executing commands from step 404c (or step 404e), where the installation/upgrade may be continued from the command in the storage command file 344 that caused the failure. If the error is not found (step 404h), the installation/upgrade is stopped in expectation of manual intervention (step 404l).

Referring to FIG. 15, there is shown an example of a storage state file 350. The state file 350 is created by the state machine 346 and keeps track of the execution of commands in the command file 344. This is achieved by keeping the following information in a persistent file which will exist through out the operation.

Index 444a: Index into the command array of the last successful command executed (to be described); To_LVMtable_checksum 444b: checksum of new storage information file; To_LVMtable 444c: location of new storage information file; From_LVMtable_checksum 444d: checksum of previously existing LVM table file, if it exists; From_LVMtable 444e: location of previously existing LVM table if it exists; Device_map_dir 444f: directory where product-specific device map is located; storage command_file_checksum 444g: checksum of storage command file; storage command_file 444h: location of storage command file; mode 444i: install/upgrade recover operation mode; platform 444j: product-specific fields;

The state machine 346 first determines what the target (upgrade) To_LVMtable file 340 and original (present) "From_LVMtable" is, if there is one. (FIG. 14 step 404a) And based on the install/upgrade/recovery mode and "lvm version", it then determines the appropriate command file 344a . . . n (FIG. 14 step 404b). It will use this information and corresponding checksums to fill the field values in the state file 350.

Figure 16:
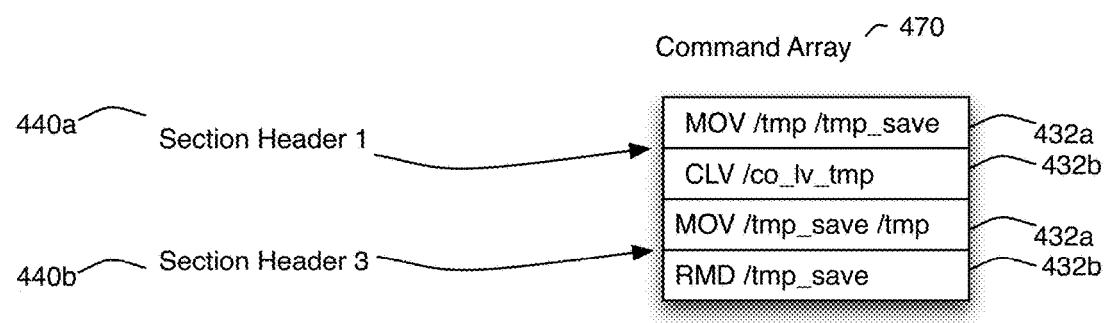
FIG. 16 is an exemplary representation of a command array produced by the storage state file of the invention.

The state machine 346 then determines the applicable sections within the command file 344 (FIG. 14 step 404b) based on attributes of the present version of software and features and the version of software and features to be installed, along with other product specific fields. In accordance with a further aspect of the invention, once the sections of the command file 344 are identified, a command array is assembled. Referring to FIG. 16, an example of such a command array 470 is shown. In this case, section headers 1 and 3 (440a and 440b) indicate that the commands 432 in these sections are associated with a newer LVM 326 configuration than the LVM 326 configuration installed with the present software. So, the commands 432a . . . n from sections 1 (440a) and 3 (440b) are gathered into an array 470. The commands 432 associated with header 440a are shown as MOV and CLV commands from the list of commands above. The commands 432 associated with header 440b are shown as MOV and RMD commands. Now that these commands are consolidated into a command array 470, they can be executed (FIG. 14 step 404*c*) in order to perform the upgrade from the present software to the software including the updated LVM partitions.

The state machine 346 employs the state file 350 in order to keep persistent state during an installation, recovery, or upgrade operation. For example, it can handle rebooting of a system (voluntarily or involuntarily), and continue the remaining process. This allows the operation to persist even while the process requiring a system reboot continues.

Upon initially recovering from a failure, the state machine 346 will first verify the field values in the state file 346. If all fields are valid, including checksums 444*b* and 444*g*, it can use the "Index" field to skip any commands in the command array 470 which were already completed. This mechanism works well since any command in the command file 470 is idempotent. That is, the same command can be executed any number of times and it will result in same result.

In accordance with another aspect of the invention, the upgrade software 332 is further enhanced to improve on overall maintenance and user experience. In basic use, if the upgrade software encounters an error at step 404*d*, it can return an error code and stop operating. Although the last error can be retried, if that error is persistent, it will yield the same result. This scenario can be problematic as the system is left part way into a system upgrade process. Typically, as previously described regarding the general case, service personnel would come in and examine the faulted issue, and manually fix the problem and resume the upgrade process. In addition, the upgrade source code would be re-written so that it can better handle against such issues in the future.

As previously described with reference to FIG. 13, in accordance with an aspect of the invention, an error information file 348 provides new instructions, or opcodes, can be "loaded in" which are not part of the original resident codes in the storage command file 344. More particularly, the error information file 348 consists of command opcodes (for example 432*a*, 432*b*) and corresponding specific error codes (450*a* . . . *n*). The location of a resolution file 452*a* . . . *n* is listed for each error code 450*a* . . . *n*. Each resolution file 452*a* . . . *n* consists of command opcodes 432*a* . . . *n* as the operation "instructions" that are specific to resolving a given unique error code 450. "Resume after resolution" is a choice to indicate to the state machine 346 to retry the original opcode 432 upon executing the instructions as noted in the resolution file 452. This opcode 432 is the opcode in the command array 470 that produced the error from step 404*d* (FIG. 14). For those opcodes 432 that are not listed in this table, if an error is found when executing a given opcode 432, the default operating behavior would still apply, which is stop at the point when fault is found, and expect manual intervention by users (e.g. to retry the attempt).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. A computer readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or blocks. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A method of deploying software in a system where multiple versions of the software are available, comprising the steps of:

distributing to the system upgrade software of system software without foreknowledge of a present version of the system software currently installed on the system, wherein the system software comprises an operating system and one or more applications;

deploying a software update, wherein the upgrade software includes the software update, an information file, a command file, and an error information file;

storing on a storage device of the system, in response to executing the upgrade software, information of the information file representing a version of software that is being installed on the system, the version of software being installed by the software update adding a new feature to the system software or having an update to an existing feature of the system software, wherein the information file comprises a table that lists a number of characteristics of at least one of the software or the feature of the software, and wherein the new feature or existing feature resides across a stack including the operating system and one or more applications of the system software;

storing on a storage device of the system, in response to executing the upgrade software, the command file including a plurality of groups of commands, one or more of the groups of commands enabling a transition from the present version of the system software currently installed on the system to another version of software having the new feature or another version of the existing feature, wherein each group of commands of the plurality of groups of commands includes commands that enable a transition from one of the plurality of first versions of the system software to one of a plurality of second versions of the system software, wherein the present version of the system software is one of the first versions of the system software and the upgrade software version is one of the second versions of the system software, and wherein each groups of commands of the plurality of groups of commands includes a header information section indicating a second version to which the group of commands are associated;

executing on the system, in response to executing the upgrade software, a state machine that consults the stored information to determine which one or more groups of commands of the plurality of groups of commands are needed and which groups of commands are unnecessary to transition from the present version of the system software currently installed on the system to the version of software that is being installed having the update to the feature, the state machine forming a command array including the applicable groups of commands of the determined one or more groups of commands which are needed, wherein a group of commands is required when the header information section included by that group of commands indicates a second version associated with the new feature or the newer version of the feature than the version of the feature installed with the present version of the system software or a version between the present version of the system software and the version of the upgrade software required to install the software update, the state machine employing a state file that maintains a persistent state during an installation, upgrade, or recovery operation, the state file tracking an execution of commands in the command file, the state file including a command file field that includes a location of the command file and an index field that indexes a last successful command in the command array;

executing each needed group of commands in the command array to transition from the present version of the system software currently installed on the system to the version of software that is being installed having the update to the feature; and in response to an error that occurs during the execution of each needed group of commands:

storing on a storage device recovery information including a list of common errors of the error information file, each common error in the list being associated with a remediation group of commands for resolving that common error;

storing, on a storage device of the system, the recovery information including a list of errors related to the execution of one or more group of commands of the plurality of groups of commands and stored in the error information file;

determining the error is one of the common errors in the list of common errors in the recovery information and is associated with a given remediation group of commands;

in response to determining that the error is one of the common errors in the list of common errors in the recovery information, executing the given remediation group of commands associated with the error; and after execution of the given remediation group of commands associated with the error, resuming the execution of each needed group of commands at a command that caused the error.

2. The method of claim 1 wherein the step of executing a state machine that consults the stored information to determine which one or more groups of commands of the plurality of groups of commands are needed further comprises the step of comparing the stored information to current information representing the present version of the system software currently installed on the system in order to ascertain which one or more of the groups of commands should be executed.

3. The method of claim 2 wherein each group of commands in the plurality of groups of commands is associated with header information section, and wherein the step of executing each needed group of commands includes executing the commands in that needed group of commands if the header information section associated with that needed group of commands indicates that the commands in that needed group are associated with a version of the system software having a newer version of the feature than the present version of the system software currently installed on the system.

4. The method of claim 3 wherein each command in each group of commands is a pseudo-command translatable to a programming language.

5. The program product of claim 4 wherein the feature is related to partitioning of logical volumes for storage management.

6. A computer program product, comprising a non-transitory computer-readable storage medium having computer readable program code embodied therein, said computer program product comprising:

upgrade software distributable to a system without foreknowledge of a present version of system software currently installed on the system, the upgrade software including a software update, an information file, a command file, and an error information file;

the upgrade software, if executed, being configured to store on the system a table with information of the information file representing the version of software that is being installed, the version of software being installed by the software update adding a new feature to the system software or having an update to an existing feature of the system software, wherein the information file comprises a table that lists a number of characteristics of at least one of the software or the feature of the software, and wherein the new feature or existing feature resides across a stack including the operating system and one or more applications of the system software;

the upgrade software, if executed, being further configured to store on the system a command file having a plurality of groups of commands, one or more of the groups of commands enabling a transition from the present version of the system software installed on the system to another version of software having the new feature of another version of the existing feature, wherein each group of commands of the plurality of groups of commands includes commands that enable a transition from one of the plurality of first versions of the system software to one of a plurality of second versions of the system software, wherein the present version of the system software is one of the first versions of the system software and the upgrade software version is one of the second versions of the system software, and wherein each groups of commands of the plurality of groups of commands includes a header information section indicating a second version to which the group of commands are associated;

a state machine that consults the stored information to determine which one or more groups of commands of the plurality of groups of commands are needed and which groups of commands are unnecessary to transition from the present version of the system software installed on the system to the version of software that is being installed having the update to the feature, the state machine forming a command array including the applicable groups of commands of the determined one or more groups which are needed, wherein a group of commands is required when the header information section included by that group of commands indicates a second version associated with the new feature or the newer version of the feature than the version of the feature installed with the present version of the system software or a version between the present version of the system software and the version of the upgrade software required to install the software update, the state machine employing a state file that maintains a persistent state during an installation, upgrade, or recovery operation, the state file tracking an execution of commands in the command file, the state file including a command file field that includes a location of the command file and an index field that indexes a last successful command in the command array;

logic for executing each needed group of commands in the command array to transition from the present version of the system software installed on the system to the version of software that is being installed having the update to the feature; and logic for performing the following steps in response to an error that occurs during the execution of each accessed group of commands:

storing recovery information including a list of common errors of the error information file, each common error in the list being associated with a remediation group of commands for resolving that common error;

storing the recovery information including a list of errors related to the execution of one or more group of commands of the plurality of groups of commands and stored in the error information file;

determining the error is one of the common errors in the list of common errors in the recovery information and is associated with a given remediation group of commands;

in response to determining that the error is one of the common errors in the list of common errors in the recovery information, executing the given remediation group of commands associated with the error; and after execution of the given remediation group of commands associated with the error, resuming the execution of each needed group of commands at a command that caused the error.

7. The program product of claim 6 wherein the state machine that consults the stored information to determine which one or more groups of commands of the plurality of groups of commands are needed further comprises logic for comparing the stored information to current information representing the present version of the system software currently installed in order to ascertain which one or more of the groups of commands should be executed.

8. The program product of claim 7 wherein each group of commands in the plurality of groups of commands is associated with header information, and wherein the logic for executing each needed group of commands executes the commands in that needed group of commands if the header information associated with that needed group of commands indicates that the commands in that needed group are associated with a version of the software having a newer version of the feature than the present version of the system software currently installed on the system.

9. The program product of claim 8 wherein each command in each group of commands is a pseudo-command translatable to a programming language.

10. The program product of claim 8 wherein the feature is related to partitioning of logical volumes for storage management.

11. A method of deploying software in a storage system where multiple versions of the software are available, comprising the steps of:

distributing to the system upgrade software of system software without foreknowledge of a present version of the system software currently installed on the system, wherein the system software comprises an operating system and one or more applications;

deploying a software update, wherein the upgrade software includes the software update, an information file, a command file, and an error information file, wherein the information file comprises a table that lists a number of characteristics of at least one of the software or a feature of the software;

storing on the storage system, in response to executing the upgrade software, information of the information file representing a version of software that is being installed, the version of software being installed implementing updated logical volume management partitions, the version of software being installed by the software update adding a new feature to the system software or having an update to an existing feature of the system software, and wherein the new feature or existing feature resides across a stack including the operating system and one or more applications of the system software;

storing on the storage system, in response to executing the upgrade software, the command file including a plurality of groups of commands, one or more of the groups of commands enabling a transition from a currently installed present version of the system software that may not implement logical volume management partitions or may implement an old version of logical volume management partitions to another version of software having another version of logical volume management partitions, wherein each group of commands of the plurality of groups of commands includes commands that enable a transition from one of the plurality of first versions of the system software to one of a plurality of second versions of the system software, wherein the present version of the system software is one of the first versions of the system software and the upgrade software version is one of the second versions of the system software, and wherein each groups of commands of the plurality of groups of commands includes a header information section indicating a second version to which the group of commands are associated;

executing on the storage system, in response to executing the upgrade software, a state machine that consults the stored information to one or more groups of commands, the state machine comparing the stored information to current information representing the present version of the system software currently installed in order to ascertain which one or more of the groups of commands of the plurality of groups of commands are needed and which groups of commands are unnecessary in order to transition from the present version of the system software to the version of software having the updated logical volume management partitions, the state machine forming a command array including the applicable groups of commands of the determined one or more groups of commands which are needed, wherein a group of commands is required when the header information section included by that group of commands indicates a second version associated with the new feature or the newer version of the feature than the version of the feature installed with the present version of the system software or a version between the present version of the system software and the version of the upgrade software required to install the software update, the state machine employing a state file that maintains a persistent state during an installation, upgrade, or recovery operation, the state file tracking an execution of commands in the command file, the state file including a command file field that includes a location of the command file and an index field that indexes a last successful command in the command array;

executing each needed group of commands in the command array to transition from the currently installed present version of the system software to the version of software that is being installed having the updated logical volume management partitions;

in response to an error that occurs during the execution of each needed group of commands:
  storing recovery information including a list of common errors of the error information file, each common error in the list being associated with a remediation group of commands for resolving that common error;
  storing the recovery information including a list of errors related to the execution of one or more group of commands of the plurality of groups of commands and stored in the error information file;
  determining the error is one of the common errors in the list of common errors in the recovery information and is associated with a given remediation group of commands;
  in response to determining that the error is one of the common errors in the list of common errors in the recovery information, executing the given remediation group of commands associated with the error; and
  after execution of the given remediation group of commands associated with the error, resuming the execution of each needed group of commands at a command that caused the error.

12. The method of claim 11 wherein each group of commands in the plurality of groups of commands is associated with header information, and wherein the step of executing each ascertained group of commands includes executing the commands in that ascertained group of commands if the header information associated with that ascertained group of commands indicates that the commands in that ascertained group are associated with a version of the system software having a newer version of logical volume management partitions than the currently installed present version of the system software.

13. The method of claim 12 wherein each command in each group of commands is a pseudo-command translatable to a programming language.

14. The method of claim 1, wherein the feature resides within an application, within an operating system, or across a stack including the operating system and layers of applications.

15. The method of claim 6, wherein the feature resides within an application, within an operating system, or across a stack including the operating system and layers of applications.

16. The method of claim 11, wherein the feature resides within an application, within an operating system, or across a stack including the operating system and layers of applications.

* * * * *